US008655855B2

(12) United States Patent
Christ et al.

(10) Patent No.: US 8,655,855 B2
(45) Date of Patent: Feb. 18, 2014

(54) POST STORING CORRECTION (75) Inventors: Thomas Christ, Kronau (DE); Thomas Griesser, Walldorf (DE); Bernhard Hauser, Heidelberg (DE); Tobias Gutwein, Gorxheimertal (DE); Harald Breitling, Bad Schoenborn (DE); Daniel Tschoeke, Leimen (DE)

(73) Assignee: SAP Aktiengesellschaft, Walldorf (DE)

( * ) Notice: Subject to any disclaimer, the term of this patent is extended or adjusted under 35 U.S.C. 154(b) by 1770 days.

(21) Appl. No.: 11/298,444

(22) Filed: Dec. 9, 2005

(65) Prior Publication Data
US 2007/0136151 A1 Jun. 14, 2007

(51) Int. Cl.
*G06F 7/00* (2006.01)
*G06F 17/00* (2006.01)

(52) U.S. Cl.
USPC .......................................................... 707/694

(58) Field of Classification Search
USPC ........ 705/1, 26, 60, 28, 5; 235/385; 707/5, 10
See application file for complete search history.

(56) References Cited

U.S. PATENT DOCUMENTS

| 5,310,997 | A  | * | 5/1994 | Roach et al. ................. 235/375 |
| 6,539,386 | B1 | * | 3/2003 | Athavale et al. ............... 707/10 |
| 6,772,028 | B1 | * | 8/2004 | Yen et al. ...................... 700/99 |
| 7,050,995 | B2 | * | 5/2006 | Wojcik et al. ................. 705/28 |
| 2002/0072988 | A1 | * | 6/2002 | Aram .............................. 705/26 |
| 2002/0095308 | A1 | * | 7/2002 | Pragelas et al. ................. 705/1 |
| 2003/0065574 | A1 | * | 4/2003 | Lawrence ....................... 705/26 |
| 2003/0149585 | A1 | * | 8/2003 | Foster et al. ..................... 705/1 |
| 2005/0149453 | A1 | * | 7/2005 | Amling et al. .................. 705/60 |
| 2006/0054692 | A1 | * | 3/2006 | Dickey .......................... 235/385 |
| 2006/0085298 | A1 | * | 4/2006 | Inskeep et al. ................. 705/28 |
| 2006/0218058 | A1 | * | 9/2006 | Wojcik et al. ................. 705/28 |

* cited by examiner

*Primary Examiner* — Alexey Shmatov
(74) *Attorney, Agent, or Firm* — Blakeley, Sokoloff, Taylor & Zafman LLP (57) ABSTRACT Methods and apparatus provide a delay in posting a confirmation of a warehouse activity in a warehouse having decentralized management. The delay enables a process to be performed with respect to the goods associated with the confirmation. For example, the delay can enable a CRM system to route the goods to fulfill an order for goods. In another example, the delay can enable the performance of a correction to the confirmation of the goods.

23 Claims, 6 Drawing Sheets

POST STORING CORRECTION

FIELD

Embodiments of the invention relate to warehouse management, and more particularly to posting information related to goods receipt.

BACKGROUND

In a warehouse, received goods or goods moved from one station or section of a warehouse to another may be subject to a verification of the goods. The verification may include quality control checking (e.g., product integrity) as well as identity checking (e.g., part number, quantity verification, packaging checking). In a manual process, errors are possible and perhaps inevitable in the verification process. For example, if 100 units of a good are received, a person performing product verification may inadvertently press the '0' too many times, resulting in an entry of '1000' goods as the number received. Traditional methods of correcting this error in many warehouse management systems are difficult, time-consuming, and may cause significant interruption in the course of a worker's routine. Thus, a worker may choose to delay reporting or simply ignore an error, which may introduce errors into a distribution system (for example, if someone "sees" the 900 non-existent goods and tries to sell them, resulting in an inventory shortage). Traditional approaches provide inadequate methods of correcting errors that are posted to warehouse management.

SUMMARY

In a warehouse having decentralized management, a confirmation of a warehouse activity with respect to goods is received. The confirmation is stored in a memory, and a posting of the confirmation to an enterprise resource planning system is delayed to enable receiving a request to change the confirmation while the delay is active. If a change is requested prior to the expiration of the delay, the change is included in the confirmation. At the expiration of the delay, the final confirmation is posted, which should include any changes made during the delay.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Figure 1:
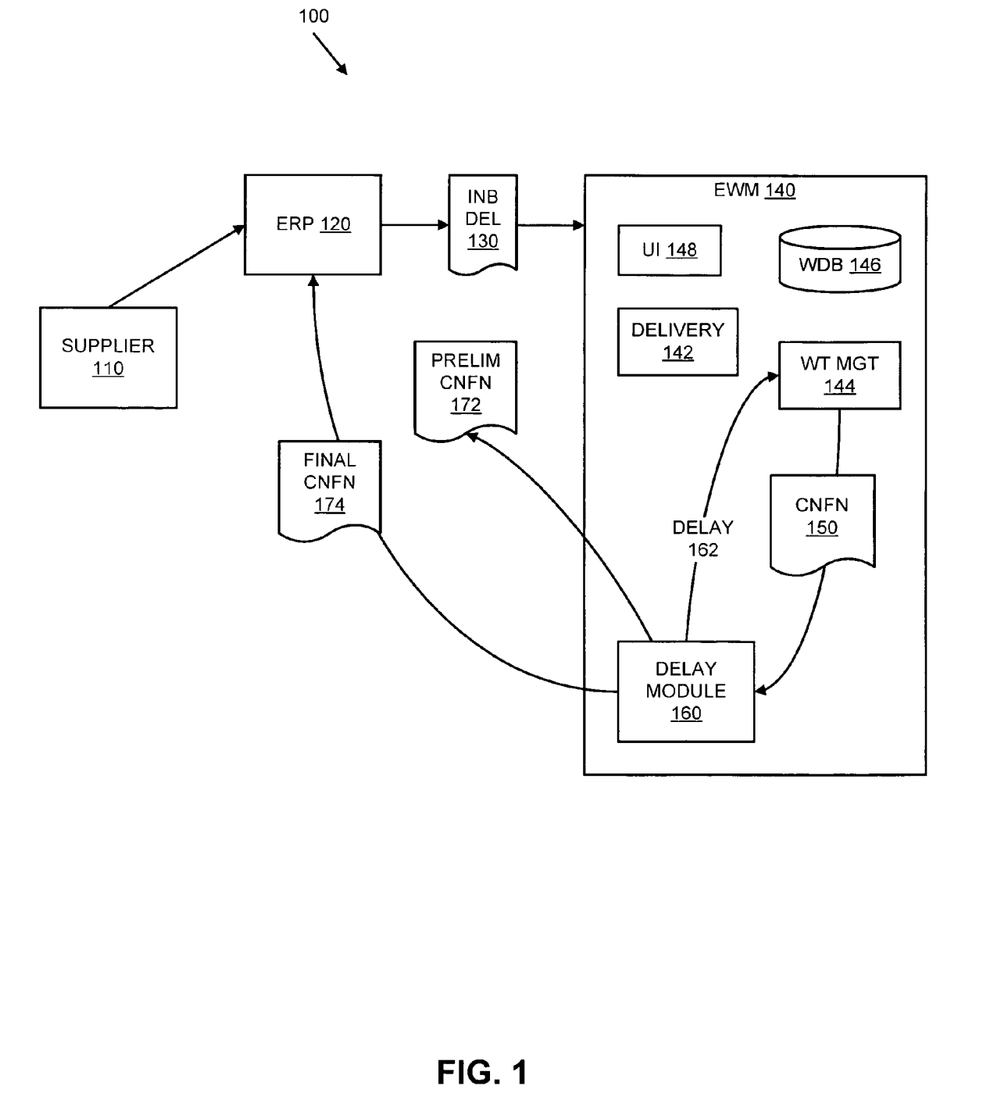
FIG. 1 is a block diagram of an embodiment of a warehouse having a delay module to delay posting of a confirmation to an enterprise resource planning system.

FIG. 1 is a block diagram of an embodiment of a warehouse having a delay module to delay posting of a confirmation to an enterprise resource planning system. Warehouse 100 provides an example of a facility for receipt, processing, and/or distribution of goods. Goods may include anything from nails and screws to door assemblies for automobiles to packaged products ready to ship. Specifically, warehouse 100 relates to the verification of goods, and the making available goods for distribution through a distribution system (e.g., an enterprise resource planning (ERP) system).

Supplier 110 represents a source of the goods, which may be any entity outside the warehouse, including an external entity (e.g., a seller, a shipping/delivery service), or another warehouse within the same enterprise. The other warehouse may be within the same plant or geographic location, or could be located geographically distant from warehouse 100. Supplier 110 delivers goods to warehouse 100, which delivery may be tracked physically and logically. FIG. 1 does not necessarily represent the physical layout of warehouse 100, but shows logical components of warehouse 100 that are used for managing/receiving/tracking/processing goods.

ERP 120 represents a distribution management system, which may track quantities and types of goods, coordinate shipments of goods out of a warehouse, indicate availability of goods (for example, available to use to fulfill orders), provide opportunistic cross-docking (for example, re-routing goods from one receive path to another, or from a receive path to a shipment path). Any of the capabilities or operations listed and/or other possible operations may be considered to be ERP activities, as used herein, referring to the inclusion or association of goods with an operation. ERP 120 includes one or more computing devices networked together to provide the capabilities mentioned above, and/or other capabilities. In one embodiment ERP 120 includes or is included within an enterprise network system (e.g., the R/3 system available from SAP AG of Walldorf, Germany), which may have one or more enterprise network servers or other devices. The enterprise servers may be server-class or another class of computers executing enterprise software. A dedicated serving appliance may also provide the architecture for ERP 120.

ERP 120 may generate inbound delivery (INB DEL) document 130. Inbound delivery document 130 generally identifies the goods received from supplier 110 and may provide a destination (e.g., warehouse storage). The identity of the goods may include a packing type, a part number, a quantity, a serial number, a product/project association, etc. Inbound delivery document 130 may include one or more fields of information that can be generated by ERP 120 and passed to one or more other systems of warehouse 100. As used herein, a system may refer to the hardware and/or software that provides a described functionality. For example, ERP 120 represents a system that provides distribution management/control. A goods receiving system may refer to hardware and/or a software application/bundle that provides one or more mechanisms to track, verify, indicate, stock, and/or perform other operations related to bringing goods into a warehouse. The hardware for a goods receiving system may include one or more servers, dedicated network service appliances, workstations, desktop/laptop computers, user input/output (I/O) terminals, etc. The software may include an application, a software suite with one or more applications and software tools, a state or operation mode of enterprise software, etc. A goods movement system refers to hardware (e.g., computer, bar-code scanner, data entry terminal, etc.) and/or software (e.g., ERP software, EWM software, warehouse task software, warehouse order software, etc.) to move goods within a warehouse. A goods movement system may include a goods receiving system. The goods movement system may include one or more verification/check processes/operations (e.g., check quantity, type, etc.).

In one embodiment ERP 120 delivers inbound delivery document 130 to EWM (Enterprise Warehouse Management) 140. EWM 140 may include the hardware mentioned above for ERP 120 and/or as described for a goods receiving system. EWM 140 may also include a memory, which may include any form of volatile (e.g., one or more varieties of random access memory (RAM)), or non-volatile (e.g., flash, hard disk, etc.). A memory is represented in FIG. 1 by warehouse database (WDB) 146. WDB 146 may be used to store any information related to goods, including but not limited to warehouse tasks, delivery documents (inbound and/or outbound), ERP data, confirmations of goods (final or temporary as described herein), etc.

EWM 140 also includes delivery module 142, which represents hardware and/or software associated with or corresponding to a goods receiving station of warehouse 100. Delivery module 142 provides one or more mechanisms for EWM 140 to receive inbound delivery document 130 and/or other documents related to an inbound delivery of goods. As used herein, something is "associated with" something else through a cooperative or complimentary relationship between the things, an indication that the thing is related to another thing (an indication stored within either thing, or stored somewhere else), etc. Thus, inbound delivery document 130 may be considered to be associated with goods provided by supplier 110, as there is a relationship between inbound delivery document 130 and the goods (for example, at least because inbound delivery document 130 indicates the goods). Something "corresponding to" something else as used herein similarly indicates a relationship between the things. Corresponding to may additionally in some uses indicate a comparison of the things.

EWM 140 may also include a warehouse task (WT) management (mgt) module 144. WT management module 144 provides management or control of one or more WTs. A WT refers to a document associated with goods and related to a movement of goods from one location to another—within warehouse 100 or an operation on goods (e.g., picking, storing, performing a quality check, etc.). As used herein document refers to an electronic and/or hard copy of information. The information can be any information/data related to goods. A document will generally refer herein to an electronic document that may be created, modified, processed, etc., by a system and/or forwarded, passed, responded to, etc., between systems.

In one embodiment WT management 144, or another component of EWM 140 generates a confirmation of an operation on goods. The operation may be any operation on goods with which a WT may be associated. An operation on goods may also be referred to as a warehouse activity. For purposes of simplicity in description, the term "WT" is used to describe any warehouse task, warehouse activity, or other operation on goods. Reference may also be made to a warehouse order (WO). A WO may refer to a group of one or more WTs, and refers to a request for goods. A WO may have multiple different types, depending upon a warehouse activity indicated for goods. Confirmation (cnfn) 150 represents a confirmation of a WT. Traditionally, confirmation 150 is sent to a delivery module that posts the confirmation to ERP 120, and a worker loses the ability to correct an error in confirmation 150 without some effort or difficulty, which typically requires the involvement of a manager. The involvement of another person can make error correction onerous.

EWM 140 also includes user interface (UI) 148, which represents hardware and software to enable a user to interface with the management system of warehouse 100. The hardware may include a cathode ray tube (CRT) or flat panel display (e.g., liquid crystal display (LCD)), as well as video driver circuits. The software may include driver software as well as one or more applications to enable a user to view what is happening in the receiving process and the confirmation process. In one embodiment a user interface application with graphical user interfaces includes a selectable or "clickable" button or tab to enable the user to select making a correction to a confirmation. The selecting of the button may generate a request to change the confirmation.

Instead of traditional posting of confirmation 150 to ERP 120, in one embodiment warehouse 100 include delay module 160 to provide delay 162 in the posting of information in confirmation 150. Note that while displayed as a component of EWM 140, delay module 160 may exist as a component separate from EWM 140, as a separate component of EWM 140, or as part of one or more components of EWM 140. Thus, delay module 160 may include any hardware or software described herein with respect to EWM 140 or the goods receiving system described above. Delay module 160 may include separate hardware/software, and/or have hardware/software that is integrated within other systems described herein.

Delay 162 represents a period of time or a time until an event (e.g., creation of a WT, receipt of a new inbound delivery, etc.) during which a correction can be made to information in a confirmation prior to posting the confirmation to ERP 120, which may operate to make the goods available for distribution as posted (for example, if confirmation indicates 200 units of a part/product, ERP 120 may fulfill requests for the up to 200 units, even if only 100 were actually received). In one embodiment delay 162 is configurable. Delay 162 may be configurable depending on a type of the goods (e.g., product type, new delivery, return), on a packing of the goods (e.g., a pallet, a box), a destination of the goods (e.g., if a destination location is currently occupied), a time of day (e.g., extended during a lunch period), a document type associated with the goods, etc. The delay may be a few minutes (e.g., for a return), or a few hours. The majority of errors that will be discovered in the receiving or Putaway stage will be discovered shortly after confirmation of the WT or while confirming the WT.

Preliminary confirmation (prelim cnfn) 172 represents a temporary or preliminary confirmation. Preliminary confirmation 172 may be confirmation 150, for example, placed in a memory or temporary storage. In one embodiment preliminary confirmation 172 is not sent to ERP 120, but is stored locally in delay module 160 or EWM 140 (e.g., in WDB 146). In another embodiment preliminary confirmation 172 is stored in ERP 120, and is marked/tagged to indicate that the confirmation is preliminary, and the goods are generally unavailable for ERP activity (however, a certain visibility can be given in ERP 120 to allow certain processes to be triggered (e.g., quality control)). During the delay period, preliminary confirmation 172 can be available for posting corrections, but keep goods associated with the confirmation from being absorbed into the ERP.

Final confirmation 174 represents a finalization or completion of confirmation. Final confirmation 174 can be generated at the expiration or termination of delay 162. For example, final confirmation 174 can be generated in response to detecting that delay 162 has expired or lapsed, or in response to an indicator generated to indicate that delay 162 is ended. Generation of final confirmation 174 can be performed after or in conjunction with the ending of delay 162. Delay 162 can be ended, for example, by the reaching of a particular amount of time (e.g., a certain number of minutes, seconds, hours), upon the rolling over of a counter, or in an event-driven manner (e.g., creation of a WT, receipt of a new inbound delivery). The posting of final confirmation 174 to ERP 120 refers to the assimilation of information from the confirmation into the distribution system associated with warehouse 100. For example, the updating of stock quantities could be one operation related to a final confirmation. The mere sending of final confirmation 174 to ERP 120 could be considered finalization, because after the release of the confirmation to ERP 120, EWM is no longer able to perform a post-storage correction (a correction after confirmation) without traditional difficulties on the goods that are subject to control/distribution by the ERP.

In one embodiment posting of final confirmation 174 includes indicating that preliminary confirmation 172 is to be considered final confirmation 174. Thus, preliminary confirmation 172 may be stored locally as part of EWM 140 and/or delay module 160, or stored at ERP 120, and then have an indicator passed to ERP 120 to change the status of a confirmation from preliminary to final.

Figure 2:
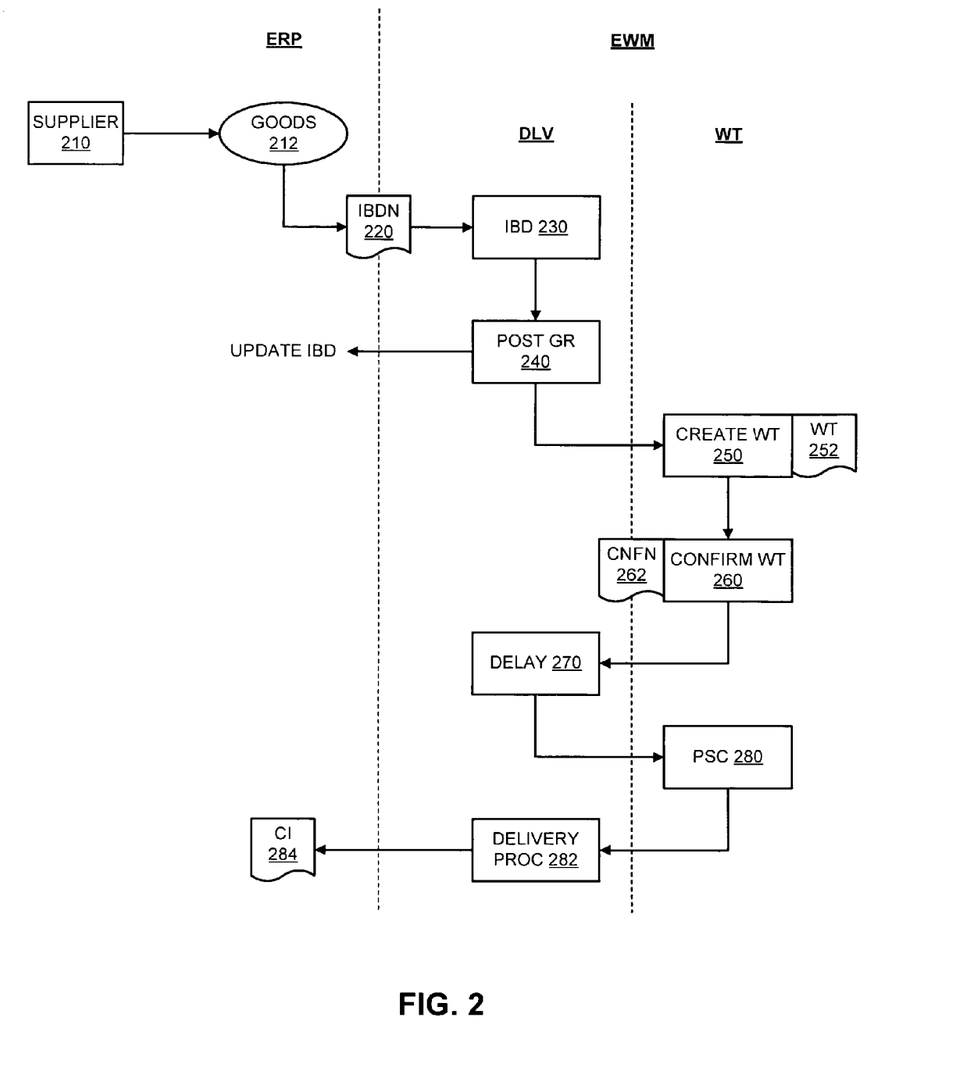
FIG. 2 is a block diagram of an embodiment of a warehouse with a management system introducing a delay in the posting of a confirmation of a warehouse activity on goods.

FIG. 2 is a block diagram of an embodiment of a warehouse with a management system introducing a delay in the posting of a confirmation of a warehouse activity on goods. ERP and EWM represent systems associated with a warehouse having decentralized management. Management of a warehouse is decentralized when multiple entities, multiple programs, multiple separate services/servers, etc., participate in control/management of the warehouse. Thus, multiple different components of a warehouse may generate control documents (e.g., WTs), or provide other control functionality. A warehouse may be identified by geography, by plant location or number. DLV and WT are Delivery and Warehouse Task systems or subsystems of the EWM.

Supplier 210 provides goods 212 to a warehouse. Goods 212 can be any type or class of goods. The ERP system may initially receive the indication of goods 212, or may generate the delivery of goods 212 (e.g., through an order/request for goods). Note that in practice, a shipping notification communicated in electronic form (e.g., an electronic document, electronic data) by a vendor/supplier may trigger a goods receipt process. Thus, the indication of goods 212 may be the shipping notification. In one embodiment the receipt of such a notification will be the normal goods receipt process, even prior to receipt of actual, physical goods. Alternatively, the indicator of goods 212 may be from a function within the ERP based on expected receipt of goods (e.g., by evaluating expected goods receipt date as stored in a purchase order, or a regular shipping schedule). The indication may be received prior to receipt of the actual, physical goods. Thus, as used herein, receiving goods, or goods receipt, may refer to receiving any type of notification (e.g., from a supplier or from the ERP), even notification prior to arrival of physical goods, receiving a document representing an impending or expected receipt of goods, and/or any type of actual physical receipt of goods. In response to receipt of goods 212, the ERP may generate inbound delivery notification (IBDN) 220. IBDN 220 is a document that can indicate the goods from the ERP to the EWM. The EWM may be divided into multiple sub-parts, either actually divided or logically divided, for example by operation/functionality. The delivery receipt system (DLV) receives IBDN 220 and processes the inbound delivery with inbound delivery (IBD) process 230. IBD 230 may include inspection of the goods to determine their status and verify the goods to enable a worker to generate a confirmation of the goods.

In conjunction with inspection of goods 212, a worker at the DLV stage may execute or complete post goods receipt (GR) process 240. Post GR 240 allows the worker to indicate that the goods were received as expected, or whether any discrepancy was observed (too many, too few, defective condition, etc.). With a posting of the goods, DLV may indicate the GR values to the ERP, which may then update inbound delivery according to the goods receipt values posted.

The DLV system may indicate post GR 240 to the WT system, or cause the WT system to execute process create WT 250 to result in the generation of WT 252. WT 252 is associated with goods 212 and may indicate movement of goods 212 within a warehouse. When the movement occurs, WT 252 will be confirmed according to the goods as received at the stage to where the WT directed the goods. Note that confirming WT 252 does not necessarily mean that the goods match in every detail the specifications of WT 252. The confirmation process enables a worker to make note of discrepancies and make changes. Thus, process confirm WT 260 may generate confirmation 262, which either corresponds directly with WT 252, or indicates discrepancies in goods 212 as received with what is indicated in WT 252.

In one embodiment the warehouse includes a module or application/subroutine to perform process delay 270 to introduce a delay between the time of confirmation of the goods to the time of final posting of the goods to the ERP system. The delay period or delay time may be referred to as post-storage correction (PSC) process 280. According to PSC 280, the system determines if a correction to information in confirmation 262 is requested or made during the delay. In one embodiment PSC 280 is trigger-driven in that the system takes no action until a trigger occurs to cause the system to make a correction, determine if a correction can be made, or finalize the confirmation process. In another embodiment the system actively checks (e.g., polling) for updated information or post-storing corrections. In response to the completion of the delay, PSC process 280 may provide an indication to the delivery system of completion. Delivery processing 282 may generate completion indicator (CI) 284 to the ERP. CI 284 may be a completed confirmation, or an indicator that a previously posted confirmation document is a final confirmation and available to the ERP for use.

Techniques described herein can be performed on components that may include hardware, software, and/or a combination of these. Reference to modules may refer to components that include hardware, software, and/or a combination of these. Software to instruct a machine to implement the techniques herein, or software to use to manufacture a device to perform the techniques described herein may be provided via an article of manufacture by a machine/electronic device/ hardware. An article of manufacture may include a machine accessible/readable medium having content to provide instructions, data, etc. The content may result in an electronic device or computing system performing various operations or executions described. A machine accessible medium includes any mechanism that provides (i.e., stores and/or transmits) information/content/instructions in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.). The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download (i.e., providing the code for access) over a communication medium may be understood as providing an article of manufacture with such content described above.

Figure 3:
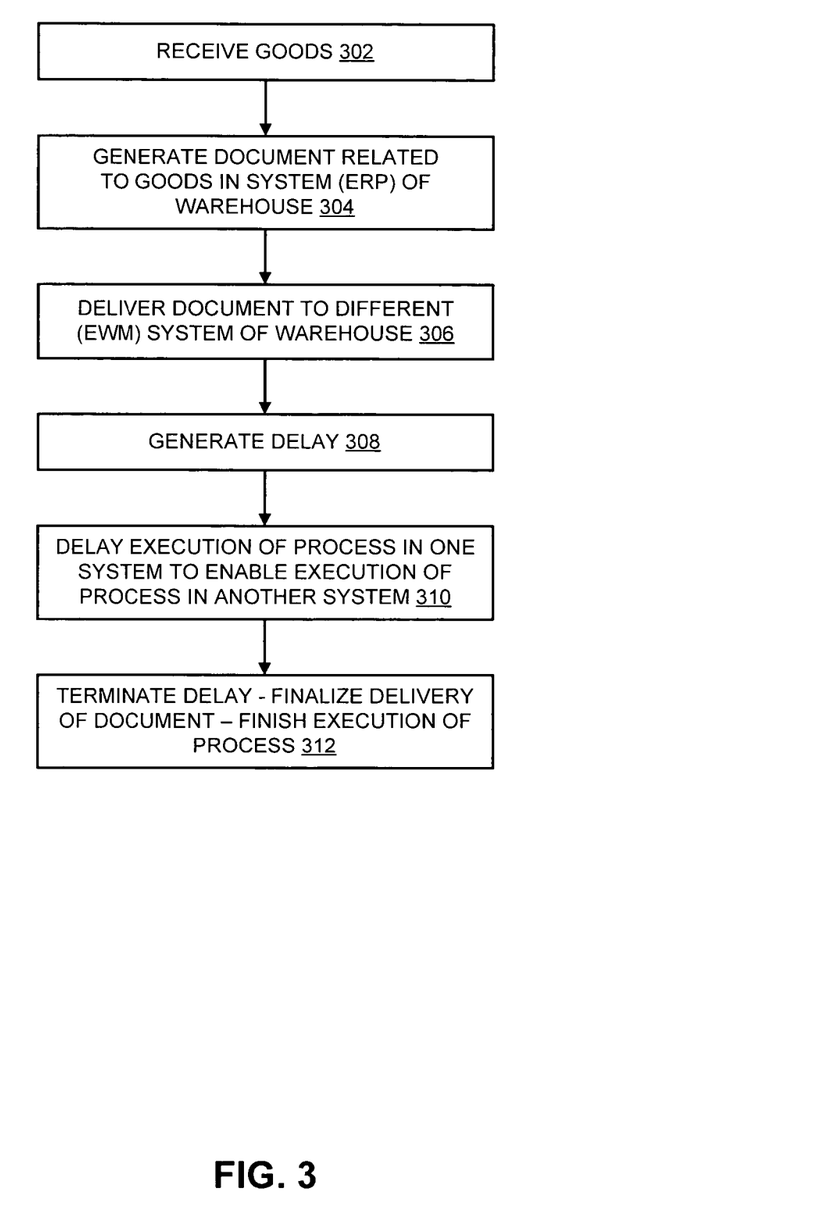
FIG. 3 is a block diagram of an embodiment of a warehouse with a management system introducing a delay in a process of one system in relation to goods to allow another process to be performed with relation to the same goods.

FIG. 3 is a flow diagram of an embodiment of generating a delay in the processing of goods received. A system in a warehouse receives goods, 302, generally in connection with a goods receipt or goods movement process. In one embodiment the receiving system generates a document related to the goods in the system of the warehouse, 304. The document may be a WT, an IBD, or other document related to the receipt and/or movement of goods.

The system that received the goods and generated the document can then deliver the document to a different system of the warehouse, 306. In one embodiment the different system is a CRM system. In one embodiment the different system is an ERP system. A delay module within the warehouse generates a delay in response to, or in relation to, the delivery of the document, 308. The delay can be configurable. The delay enables in essence a suspended state for the goods, where they are neither finally posted, nor are they awaiting verification.

The suspended state allows the system to delay execution of a process in one system to enable execution of a process in another system, 310. For example, the delay of final posting by an ERP system can enable a post-storage correction in the receiving system. In another example, the delay of final confirmation in an ERP system can enable a CRM system to determine if the goods can be cross-docked.

After a time period, or at the occurrence of an event, the delay is terminated, the delivery of the document or the posting of the confirmation is finalized, and the execution of the other enabled process can be finished, 312.

Figure 4:
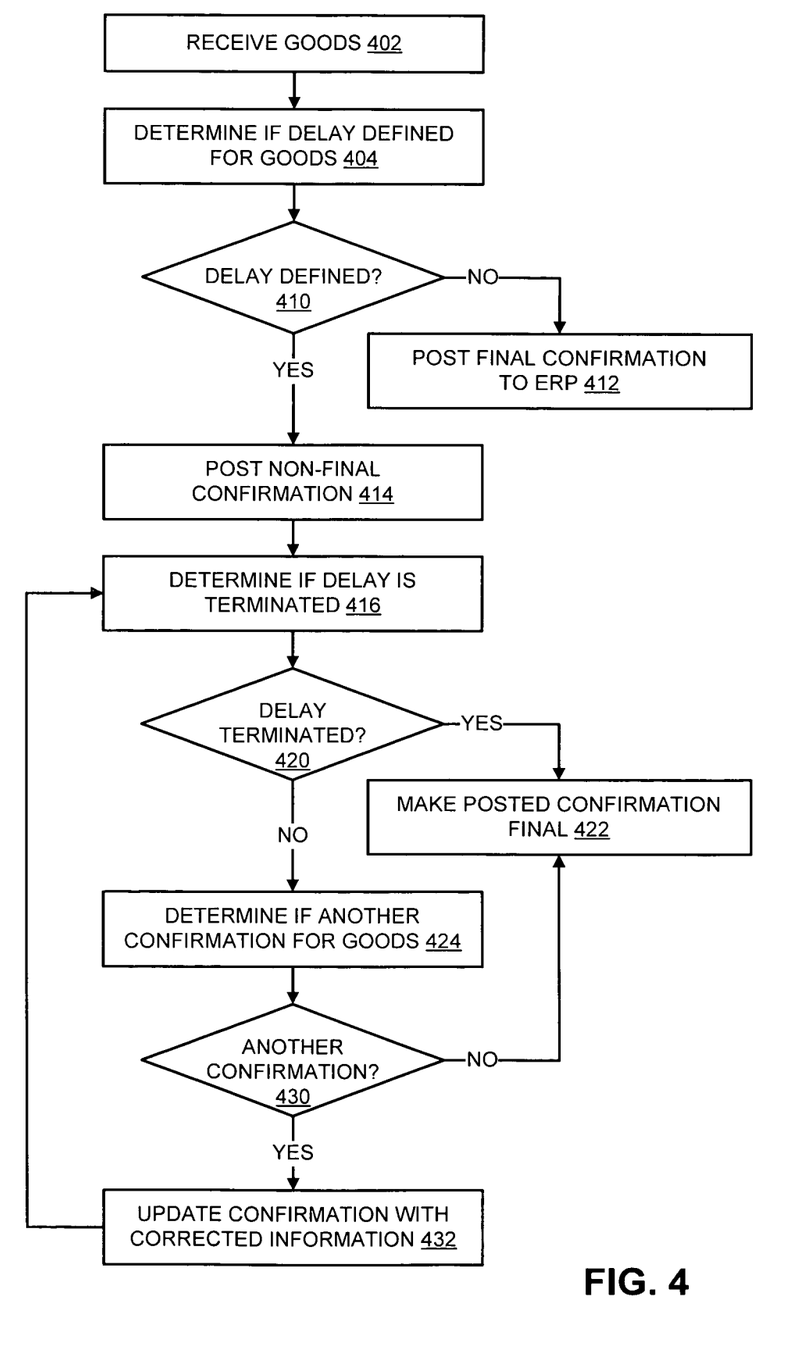
FIG. 4 is a flow diagram of an embodiment of generating a delay in the processing of goods received.

FIG. 4 is a flow diagram of an embodiment of determining whether a confirmation correction is received during a delay period. In a warehouse according to any embodiment described herein, goods are received at a goods processing station associated with receipt and/or movement of goods, 402. A goods processing station or system as used herein may refer to a station or area and/or accompanying system within a warehouse that performs one or more operations on goods related to receiving or moving goods. At a goods processing station, goods may be processed, at least in part, manually. One or more bar codes may be scanned, bar code or other ID numbers may be entered into the system. The data entry can occur via keypad, keyboard, touchscreen, radio frequency (RF) or infrared (IR) link, etc. A goods processing system could include the components for processing and the links to management. A management system associated with the station receiving the goods determines if a delay is defined for the goods, 404. The delay can be defined internally within the management system, for example, preconfigured, or user-defined. The delay can be defined in a routing table used by the system to send goods to their proper destination. The delay can be defined in a document/WT associated with the goods receiving/movement process.

If a delay is not defined for the goods, 410, the goods are posted with a final confirmation to an ERP system associated with the warehouse, 412. If a delay is defined, 410, the goods are posted with a non-final confirmation, 414. The non-final confirmation can be updated prior to finalization of the confirmation with the ERP.

The management system determines if the delay is terminated or expired, 416. If the delay is terminated, 420, the posting of the confirmation is made final, 422. If the delay is still active, the management system determines if another confirmation is made for the goods, 424.

If another confirmation is made, 430, the original confirmation is updated with the corrected information in the new confirmation, 432. The updating of the confirmation can continue until the delay expires, 416-430. If another confirmation is not made, the posted confirmation is made final, 434.

Figure 5:
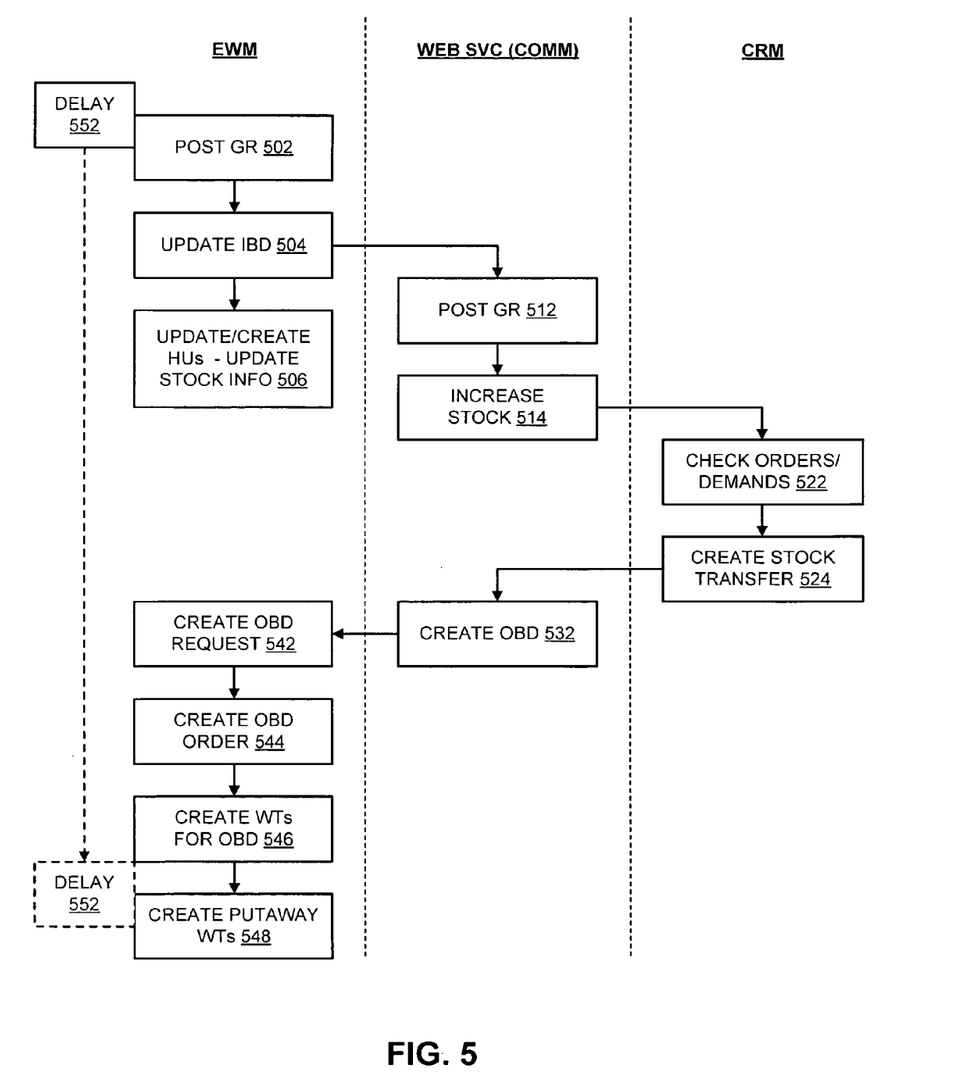
FIG. 5 is a flow diagram of an embodiment of determining if a delay is associated with posting of goods to an enterprise resource planning system.

FIG. 5 is a block diagram of an embodiment of a warehouse with a management system introducing a delay in a process of one system in relation to goods to allow another process to be performed with relation to the same goods. In a warehouse as described herein, the warehouse may include an EWM system, a Web Service(s) (WEB SVC) or other communication (COMM) system, and a customer resource manager (CRM) system. In the EWM system, goods are received and post GR process 502 is performed by the EWM system to indicate a WT to a distribution system. Delay 552 is generated concurrently, at the same time, or at substantially the same time as the execution of post GR 502 occurs. Post GR 502 may trigger execution of update IBD process 504 to coordinate any changes found in goods verification from an original inbound delivery document or posting. From update IBD process 504, the EWM system may proceed to perform one or more operations to update and/or create handling units (HUs), and update stock information 506. The handling units and stock information can prepare the goods for movement within the warehouse. The dividing of goods into HUs may be dependent upon a number of factors within the warehouse.

The EWM may also indicate the updated IBD to one or more Web Services that may provide a link to a CRM system. While Web Service is used for purposes of example herein, it will be understood that other system types may be used, e.g., a queued remote function call (qRFC), or other inter-system communication mechanism. Likewise, while CRM is used for purposes of example herein, it will be understood that other system types may be used. Thus, Web Service and CRM are used by way of example, and not by way of limitation. The Web Service can perform post GR process 512 to update information internal to the Web Service. The Web Service may also perform a process to increase stock 514 related to the one or more goods received. In one embodiment post GR 512 and increase stock 514 occur in the Web Service based on the fact that delay 552 is in place. In a traditional system, the posting of the good received could place the goods under the control of a distribution system, which may or may not allow the actions performed by the Web Service as described herein. Thus, by introducing delay 552, the EWM system may enable the performance of a process in one or more other systems during the period of the delay. By enabling the performance of the other processes, internal operations related to the goods or goods movement may be provided between the time the goods are posted and the time the delay expires and the posting is made final.

Specifically shown, the CRM may perform an operation to check orders/demands/requests for goods 522. The orders or demands for goods may be pending orders that simply need stock to be fulfilled. Thus, a streamlining of goods receipt and servicing the orders can be provided by providing the delay to enable the Web Service and CRM systems to determine if the goods would be best immediately used to fulfill an order, rather than placing the goods in storage to simply be pulled for the orders. This can enable intelligent cross-docking to enable smooth distribution of goods received in a manner not previously possible.

In one implementation a CRM "Pick from Goods-Receipt" process may be performed. In a situation where a backorder exists, during the delay the backorders may be evaluated in light of a goods receipt. If a backorder may be satisfied from the goods receipt, instead of storing the goods, the goods can be cross-docked to satisfy the backorder. Thus, if an order exists, the CRM system can perform create stock transfer process 524 to route the goods to a destination other than storage. In response to create stock transfer 524, the Web Service can create outbound delivery (OBD) 532, which would specify the destination of the goods. For purposes of moving the goods from their current physical location to the proper determined location to fulfill the order, the EWM system can create an OBD request 542. OBD request 542 can trigger the execution of create OBD order process 544. With an outbound request and an outbound order, the EWM system may perform an operation to create one or more WTs for the OBD 546. The one or more WTs may actually split the goods into part that will fulfill an order, and part that will be stored.

In another implementation, an APO (Advanced Planner and Optimizer) "Push Deployment" could be performed. Some strategic planning may obtain benefit from cross-docking goods to another location (warehouse), rather than storing the goods in the warehouse in which they were received. Thus, post GR 512 may indicate over a communication system to the APO system of the goods, which can then be checked for planning purposes to determine whether to allow the goods to follow an expected Putaway process. For example, the APO system may know of expected future demand in a facility in another area. Besides the CRM and APO examples given, many other implementations could be conceived to utilize the same concepts described herein.

In one embodiment delay 552 expires at or near the time of the creation of WTs for the OBD. The original posting may be updated as the system generates the WTs, including one or more Putaway WTs 548 to place goods in storage, if any will be placed in storage. Without delay 552, the goods would traditionally have been placed in storage, resulting in potentially many additional operations being necessary to transfer the goods to where they are needed.

Figure 6:
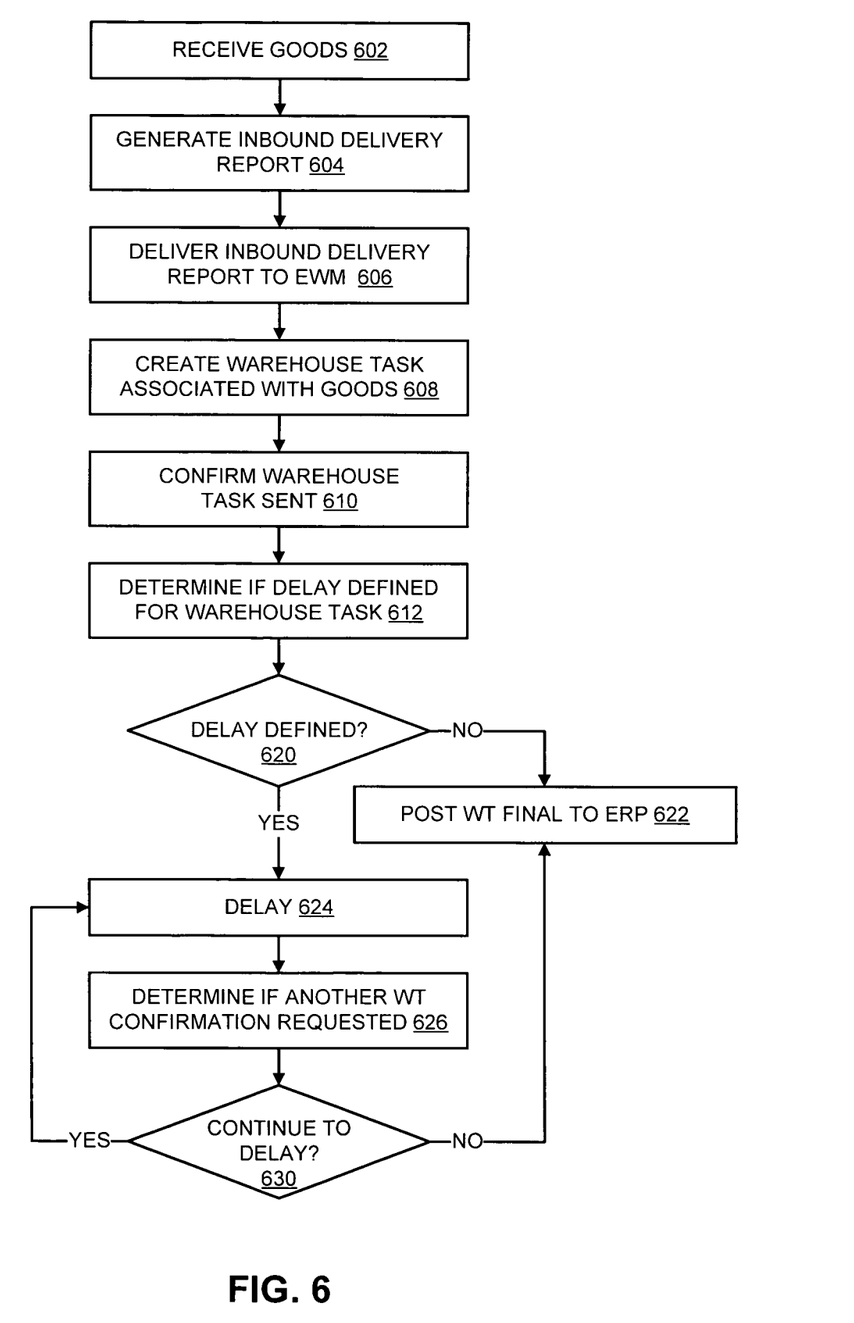
FIG. 6 is a flow diagram of an embodiment of determining whether a confirmation correction is received during a delay period.

FIG. 6 is a flow diagram of an embodiment of determining if a delay is associated with posting of goods to an enterprise resource planning system. In a receiving system of a warehouse, goods are received, 602. The receiving system generates an inbound delivery report for the received goods, 604. The inbound delivery report may indicate an expected state of the goods (e.g., a quantity, a packaging type, a destination, etc.). The inbound delivery report is delivered from the receiving system to the EWM, 606. The EWM controls the movement of the goods to the fulfilling of the inbound delivery report.

The EWM may create a warehouse task associated with the goods, 608, for example, to place the goods in storage. When the goods have moved from one station to another within the warehouse (e.g., from GR to a counting station), the movement process may request for a confirmation of the WT that moved the goods to the destination station. A worker at the destination station can send a warehouse task confirmation to the management, 610. The warehouse management may determine if a delay is defined for the WT, 612. In one embodiment certain WTs will have delays defined, and other WTs will not have a delay defined. The delay may be defined at the beginning of a process (e.g., after unloading goods received), or could be created subsequently with the generation of subsequent WTs associated with the goods. Thus, the warehouse management can check the WT to determine if a confirmation posting delay is specified. If a delay is not defined, 620, the WT confirmation is posted as a final WT to the ERP system, 622. If a delay is defined, 620, a delay is generated, 624.

During the period of the delay, the warehouse management may determine if another WT confirmation is requested for the same WT, or with respect to the same goods, 626. If an additional WT confirmation is requested, information that is different in the new WT confirmation will replace the corresponding information in the suspended WT confirmation. If the delay is still valid, the system should determine that it should continue to delay a final posting of the confirmation, 630, and proceed to delay and await another WT confirmation, if any. If the delay has expired, 630, the management system will post the WT confirmation as final to the ERP, 622.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. In a warehouse having decentralized management, a method comprising:
    receiving a confirmation of a warehouse activity on goods from a goods processing system of the warehouse, where the warehouse activity is an operation related to processing or movement of goods in a warehouse, and the confirmation includes an electronic document indicating verification of the goods and completion of the warehouse activity, which includes a request to post the confirmation to an enterprise resource planning (ERP) system, where posting the confirmation to the ERP system makes the goods available as indicated in the confirmation for an ERP activity on the goods;
    storing the confirmation in a memory as a preliminary confirmation, instead of posting the confirmation to the ERP system in response to the request to post the confirmation;
    delaying the posting of the confirmation to the ERP system to enable receiving a request for a change to the preliminary confirmation prior to an expiration of the delay;
    determining if a change to the preliminary confirmation is requested prior to the expiration of the delay; and
    posting the preliminary confirmation as a final confirmation to the ERP system to finalize the confirmation of the warehouse activity at the expiration of the delay.

2. The method of claim 1, wherein the warehouse activity comprises:
    verifying a quantity of goods in a movement of goods within the warehouse.

3. The method of claim 1, wherein the warehouse activity comprises:

verifying a type of goods in a movement of goods within the warehouse.

4. The method of claim 1, wherein delaying the posting of the confirmation comprises:
delaying the posting of the confirmation by a configurable amount of delay.

5. The method of claim 4, wherein delaying the posting of the confirmation by the configurable amount of delay further comprises:
adjusting the configurable amount based at least in part on a warehouse task order type associated with the goods.

6. The method of claim 4, wherein delaying the posting of the confirmation by the configurable amount of delay further comprises:
adjusting the configurable amount based at least in part on an identifier of the warehouse.

7. The method of claim 1, wherein determining comprises:
identifying if a request to correct information in the confirmation has been received.

8. The method of claim 1, wherein determining comprises:
identifying if a request to change a destination of the goods specified in a warehouse task associated with a movement of the goods has been received.

9. The method of claim 1, wherein the expiration of the delay comprises a termination of the delay in response to a generation of a warehouse task document.

10. The method of claim 1, wherein the expiration of the delay comprises a reaching of an amount of time.

11. The method of claim 1, wherein posting the final confirmation comprises:
writing a completion identifier to a warehouse task associated with the warehouse activity.

12. The method of claim 1, wherein posting the final confirmation comprises:
posting the preliminary confirmation, including any corrected confirmation information received, as the final confirmation.

13. An article of manufacture comprising a non-transitory machine accessible medium having content stored thereon to provide instructions to cause a machine to perform operations, including:
receiving a confirmation of a warehouse task generated at a goods processing location of a warehouse having decentralized management, where the warehouse task includes processing or movement of goods in the warehouse, and the confirmation includes an electronic document indicating verification of the goods and completion of the warehouse task, which includes a request to finalize the confirmation to a goods distribution system associated with the warehouse, where finalization includes posting of the confirmation to the goods distribution system to make the goods available for distribution as posted for a distribution activity;
delaying the finalization of the confirmation at the goods distribution system associated with the warehouse in response to the request to finalize the confirmation, the delaying of the posting to enable a change to the confirmation prior to the finalization of the confirmation to occur after expiration of a delay;
if a change to the confirmation is requested, updating information in the confirmation; and
finalizing the confirmation to the goods distribution system after expiration of the delay.

14. The article of claim 13, wherein the confirmation of the warehouse task comprises a verification of a quantity of goods associated with the warehouse task.

15. The article of claim 13, wherein the goods receiving location comprises a goods receipt station.

16. The article of claim 13, wherein the instructions for delaying the finalization of the confirmation comprise instructions to delay the finalization of the confirmation with a configurable delay.

17. The article of claim 13, wherein the change to the confirmation comprises a correction to an identifier of the goods.

18. A warehouse management apparatus of a warehouse having decentralized management comprising:
means for generating an inbound delivery document and receiving a confirmation of an identifier of received goods indicated in the inbound delivery document, where the confirmation includes an electronic document indicating verification of the identifier of the goods and completion of an inbound delivery, and a request to finalize the confirmation including posting the confirmation to an enterprise resource planning (ERP) system, where posting the confirmation to the ERP system makes the goods available as posted for an ERP activity on the goods;
processor means to execute a delay module for delaying the confirmation of the identifier for a delay period in response to the request to finalize the confirmation, determining if a change to the confirmation is requested during the delay period, and initiating finalization of the confirmation in response to an expiration of the delay period; and
means for storing the confirmation during the delay period prior to finalization of the confirmation.

19. The warehouse management apparatus of claim 18, the means for delaying the confirmation further comprising:
means for configuring the delay period based at least in part on at least one of a type of the goods or a warehouse identifier.

20. The warehouse management apparatus of claim 18, the means for initiating finalization of the confirmation further comprising:
means for changing a status of the confirmation from preliminary to final.

21. A warehouse management system comprising:
a warehouse management module in a warehouse management server to generate a goods receipt document and receive a confirmation of an identifier of received goods indicated in the goods receipt document, where the confirmation includes an electronic document indicating verification of the identifier of the received goods and completion of goods receipt, and a request to finalize the confirmation including posting the confirmation to goods distribution system, the finalization of the confirmation to enable a goods distribution system to make the goods available as posted for a distribution activity;
a delay module coupled to the warehouse management module to delay finalization of the confirmation of the identifier for a delay period in response to the request to finalize the confirmation, determine if a change to the confirmation is requested during the delay period, and initiate finalization of the confirmation in response to an expiration of the delay period;
a memory coupled to the warehouse task management module to store the confirmation during the delay period prior to finalization of the confirmation; and
a user interface module to generate a request for the confirmation.

22. The warehouse management system of claim 21, wherein the delay period is configurable.

23. The warehouse management system of claim 21, wherein the user interface module further includes a selectable graphical user interface to generate a request to change the confirmation.

\* \* \* \* \*